Dec. 25, 1951  O. F. HOMEIER ET AL  2,579,822
BELT COVERING MACHINE

Filed March 23, 1948  6 Sheets-Sheet 1

INVENTORS
OTTO F. HOMEIER
LOUIS SCHEIB
BY Henry P. Truesdell
ATTORNEY

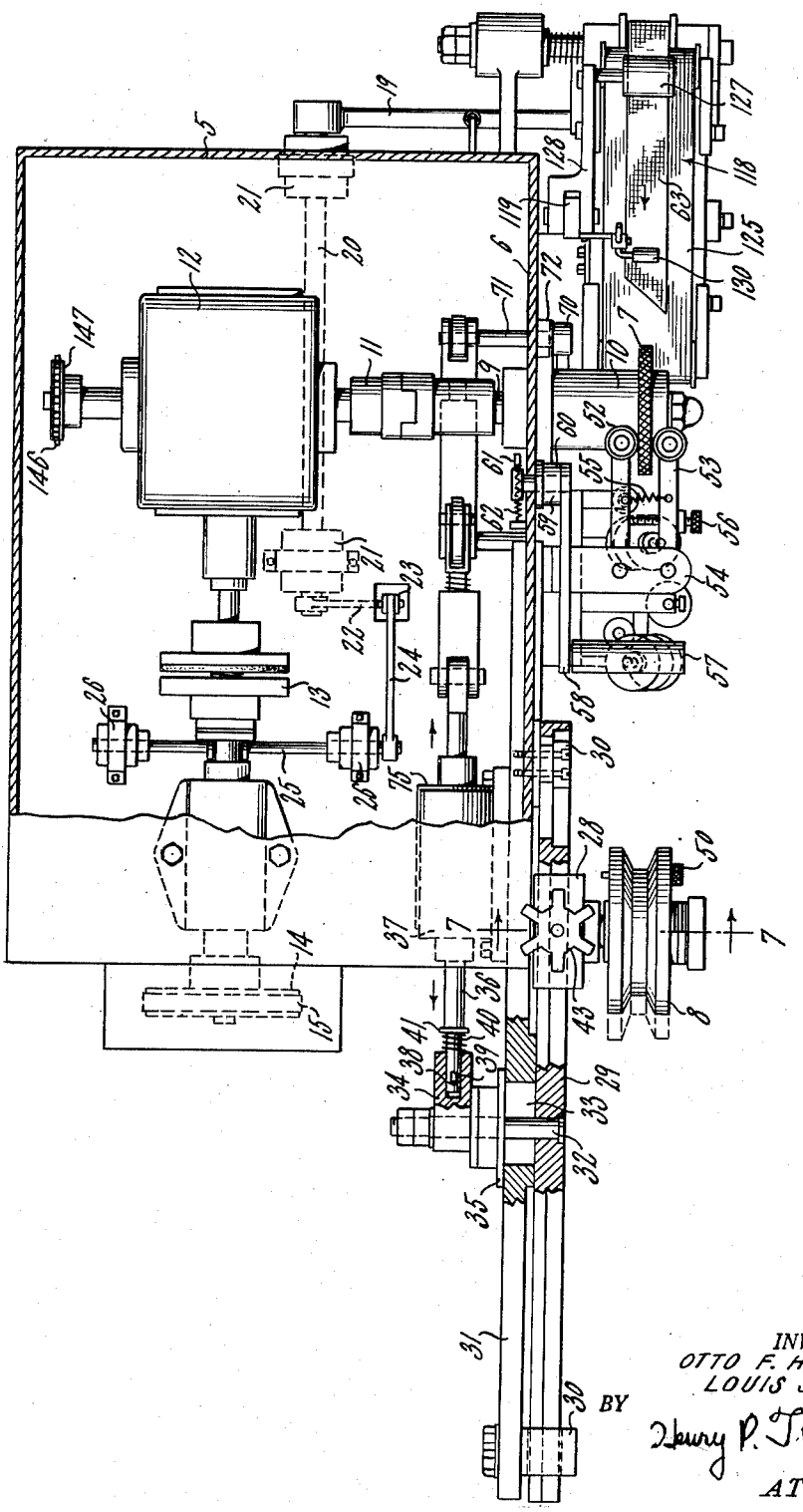

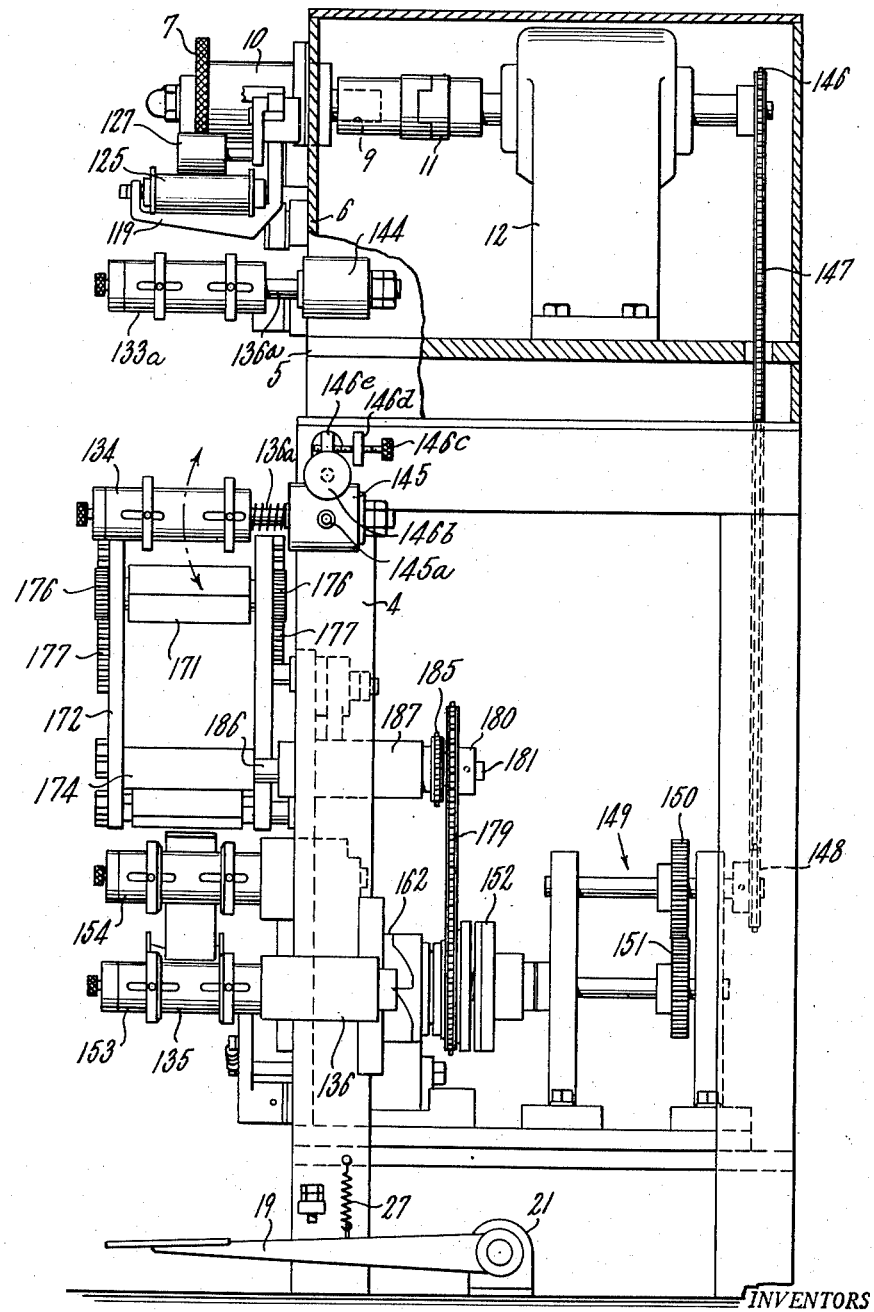

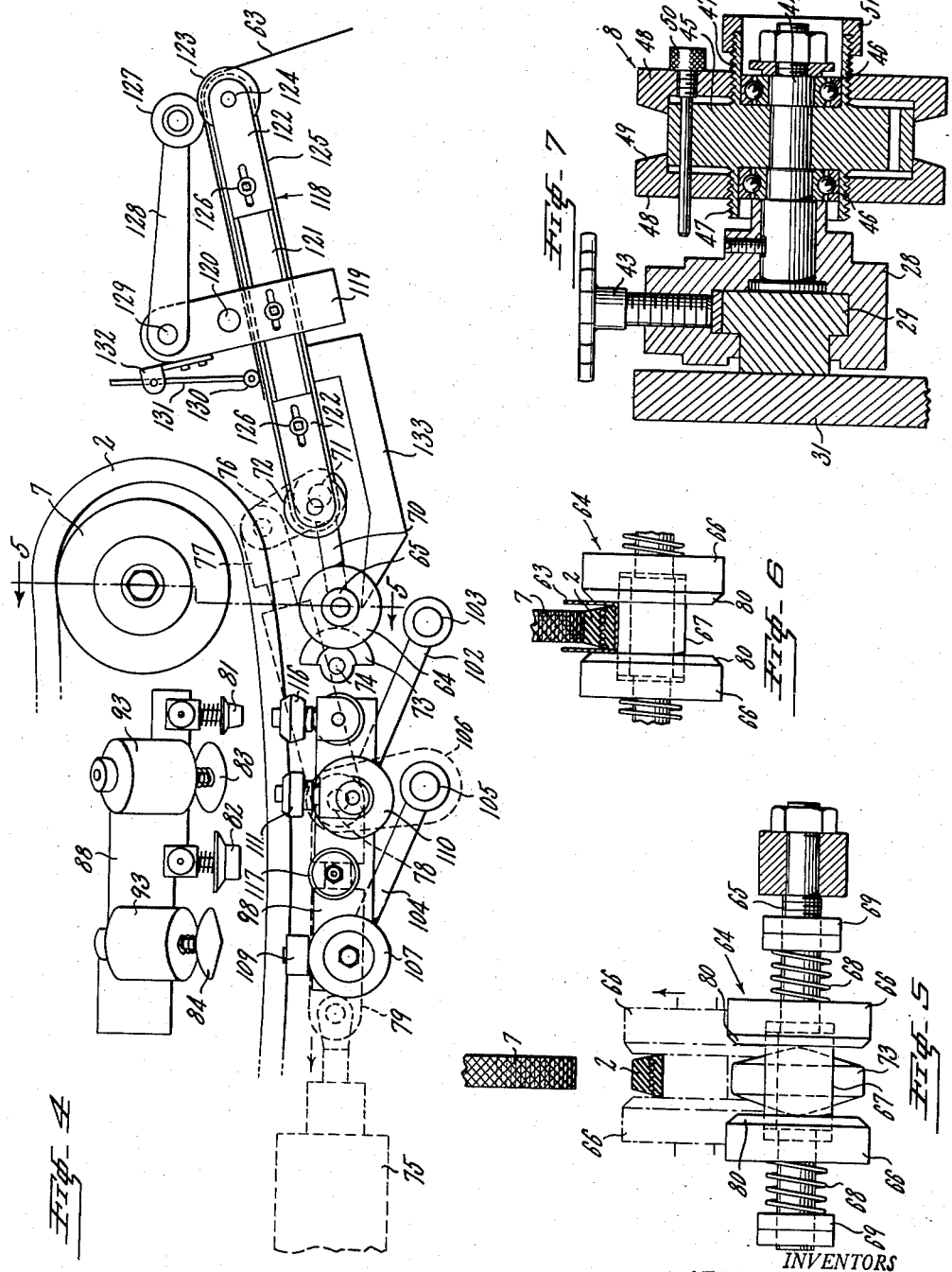

Dec. 25, 1951     O. F. HOMEIER ET AL     2,579,822

BELT COVERING MACHINE

Filed March 23, 1948     6 Sheets-Sheet 5

INVENTORS
OTTO F. HOMEIER
LOUIS SCHEIB
BY
Henry P. Truesdell
ATTORNEY

Dec. 25, 1951    O. F. HOMEIER ET AL    2,579,822
BELT COVERING MACHINE
Filed March 23, 1948          6 Sheets-Sheet 6
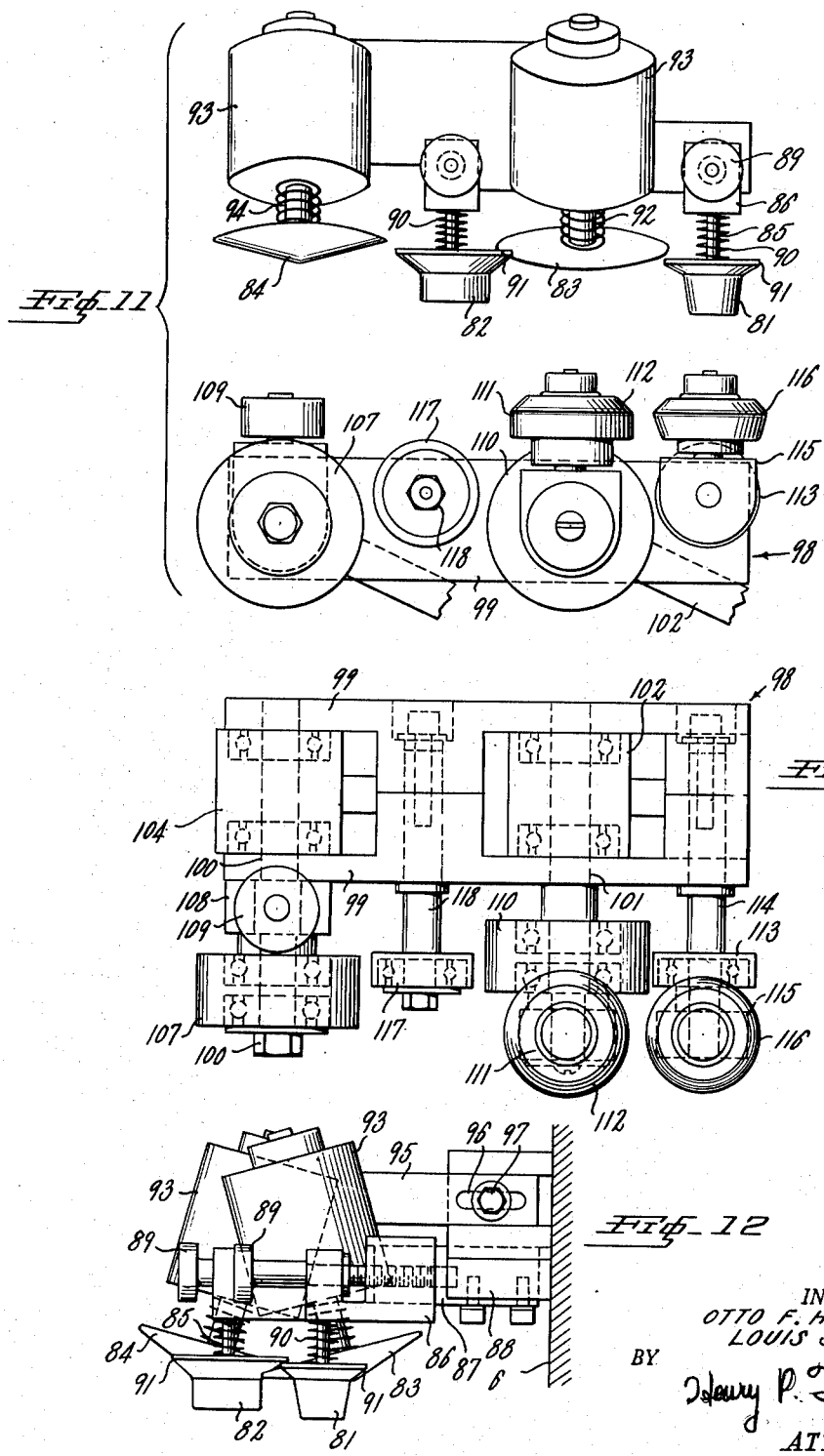
INVENTORS
OTTO F. HOMEIER
LOUIS SCHEIB
BY
Henry P. Truesdell
ATTORNEY Patented Dec. 25, 1951

2,579,822

UNITED STATES PATENT OFFICE 2,579,822

BELT COVERING MACHINE

Otto F. Homeier, Baldwin, and Louis Scheib, Brooklyn, N. Y., assignors to United States Rubber Company, New York, N. Y., a corporation of New Jersey Application March 23, 1948, Serial No. 16,476

29 Claims. (Cl. 154—3)

The present invention relates to a belt covering machine and more particularly to apparatus for applying one or more covering jackets to a belt.

One object of the invention is to provide a new and improved machine for building belts of varying lengths and in which the cross-sectional dimensions of the belts may be varied at will in the use of the machine and also the number and arrangement of the covering jackets.

Another object of the invention is to provide a machine for assembling one or more plies of rubberized fabric, or the like, as a covering or jacket for a belt carcass the plies being applied under substantially uniform tension to produce a uniform high quality product.

Still another object of the invention is to provide a belt covering machine which operates at high speed, which is so constructed as to permit easy loading and unloading of the belts and which guides and supports the belt during the covering operation.

A further object of the invention is the provision of a belt covering machine which automatically and continuously feeds the jacketing material to the belts as they are mounted on the machine.

Figure 1:
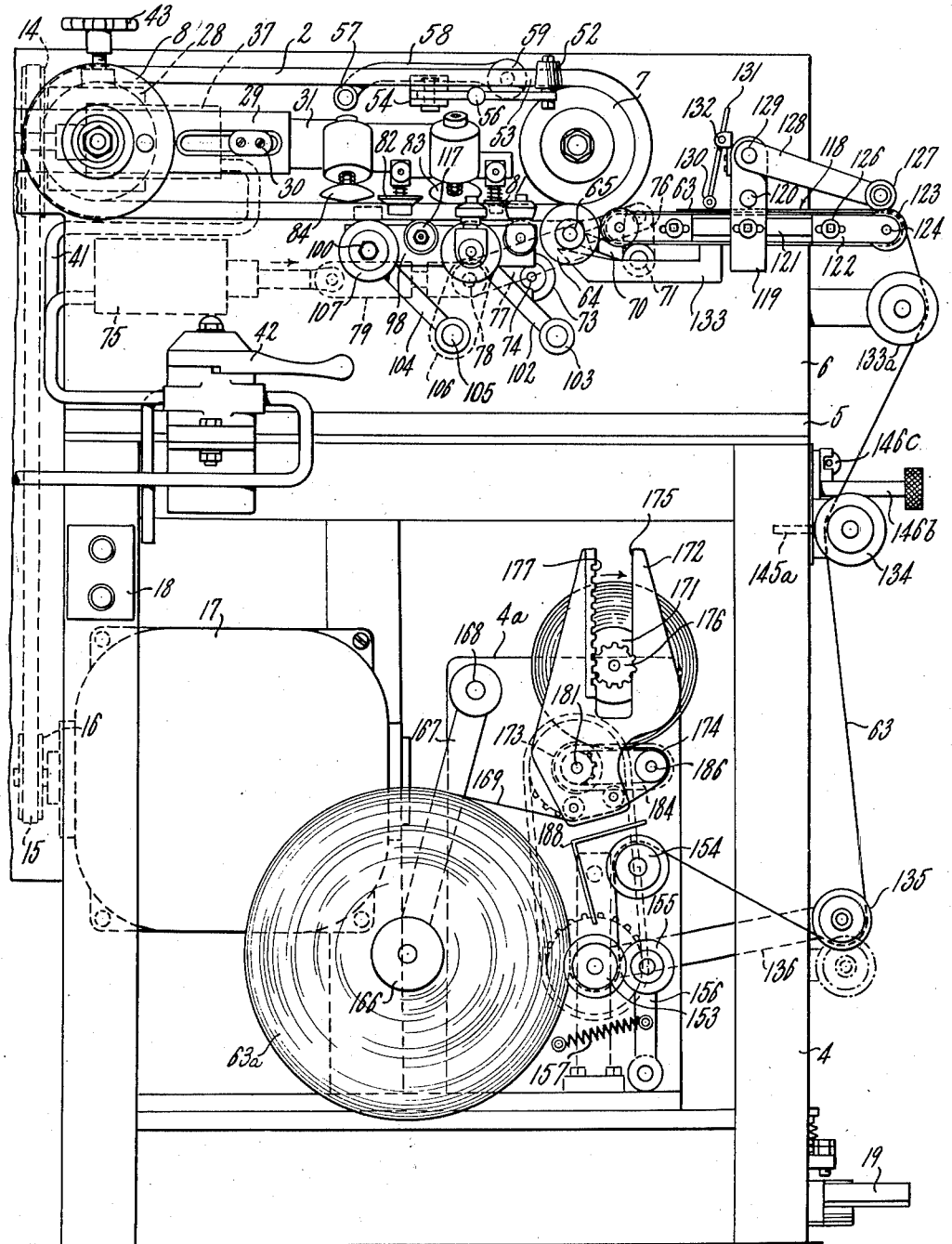
Figure 8:
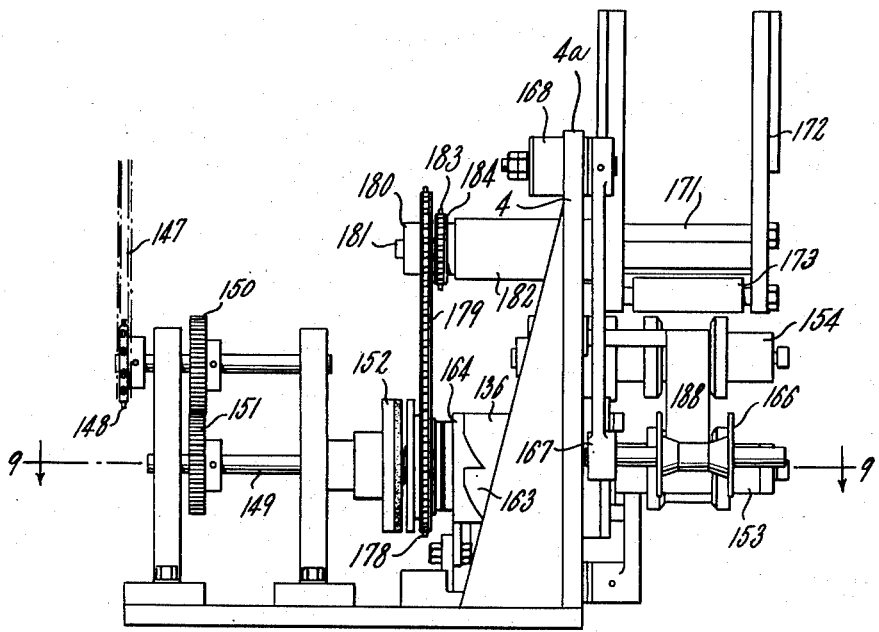
Figure 9:
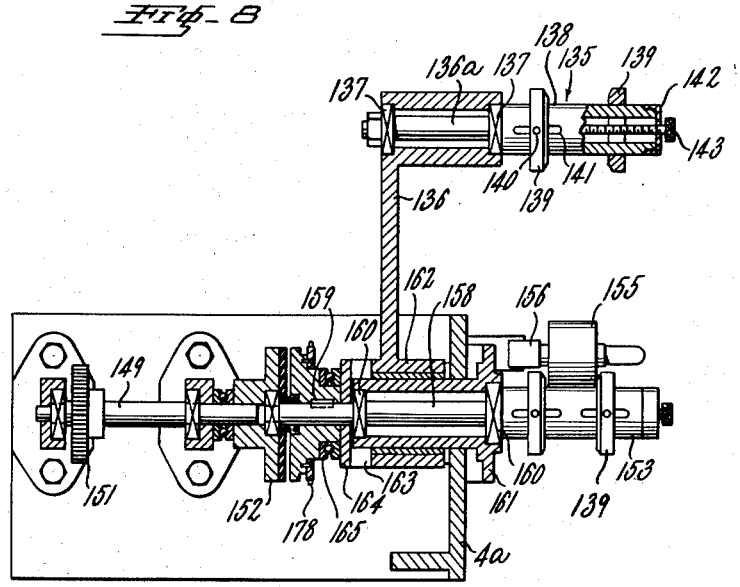
Figure 10:
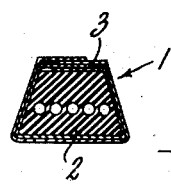

In the accompanying drawing, Fig. 1 is a front view of a machine constructed in accordance with the invention with a portion of the left-hand side of the machine omitted; Fig. 2 is a plan view of the complete machine; Fig. 3 is an end view of the machine; Fig. 4 is a view of part of the machine in belt loading position; Fig. 5 is a sectional view taken substantially along the line 5—5 of Fig. 4 showing the position of the parts during the belt loading operation; Fig. 6 is a view similar to Fig. 5 showing the position of the parts during the belt covering operation; Fip. 7 is a sectional view through one of the belt mounting pulleys taken along the line 7—7 of Fig. 2; Fig. 8 is a view of part of the belt jacket drive mechanism; Fig. 9 is another view of a portion of the jacket drive mechanism taken substantially along the line 9—9 of Fig. 8; Fig. 10 is a sectional view of one form of belt which may be covered by the machine of the instant invention; Fig. 11 is an enlarged view of part of the jacket folding mechanism; Fig. 12 is an end view of part of the mechanism of Fig. 11; and Fig. 13 is a plan view of part of the folding mechanism of Fig. 11.

Referring to the drawings, Fig. 10 represents a sectional view through a belt 1 which comprises a carcass 2 of rubber compound and cord plies, the carcass being covered by one or more jackets 3 of rubberized fabric, or the like. In manufacture, the carcass 2 is built up on a drum either in a long length or as an endless belt. The jackets are then wrapped longitudinally along the length of the belt and it is to a machine for applying the jacket that the present invention relates. Manifestly, the cross-sectional dimensions and contour of the belt may be varied at will. The machine is useful in covering rectangular belts as well as the well-known V-belts.

The machine, as shown in Fig. 1, includes a frame 4 provided withg a plate 5 and a panel 6 for supporting the operative parts of the machine. A carcass 2, in this case an endless belt, is mounted between a driving pulley 7 and a driven pulley 8. When the pulley 7 is rotated the belt is driven in a clockwise direction between the two pulleys so that the jacket may be applied along the length of the belt as it rotates. The pulley 7 is fastened to a shaft 9 (Fig. 3) journaled in a bearing housing 10 mounted on the panel 6. A universal coupling 11 connects the shaft 9 with a conventional gear box 12. In turn, the gear box is driven by a transmission system which includes a clutch 13 (Fig. 2), sheave 14, V-belt 15, a driving sheave 16 and motor 17 (Fig. 1). The motor is controlled by the usual starter 18. In order to drive the pulley 7 the clutch mechanism 13 is engaged by means of a linkage which includes a foot-pedal 19, pivoted to one end of a rod 20 (Fig. 2) carried in spaced bearings 21; the other end of the rod carries an arm 22 secured by a link 23 to an arm 24 forming part of a clutch operating yoke 25. The yoke 25 pivots in bearings 26 and thrusts the two faces of the clutch mechanism 13 into engagement with each other so that the gear mechanism 12 is operated by the drive motor 17. A spring 27 (Fig. 3) biases the foot-pedal 19 to inoperative position. To drive the belt the operator simply steps on the foot pedal.

In order to mount the belt on the two pulleys, the pulleys 7 and 8 are movable relative to each other. To this end, the pulley 8 is mounted so that it can be moved toward and away from the pulley 7. It is mounted on a bracket 28 carried by a slide bar 29 movable on spaced guides 30. The left-hand guide is carried by a supporting arm 31 extending outwardly from the left-hand side of the machine, as shown in Fig. 2. To move the slide bar 29 and pulley 8 relative to the pulley 7, the bar is provided with a pin 32 extending through a guide slot 33 in the arm 31 into a block 34 and pad 35 which slide along the arm; a piston rod 36 extending from an air cylinder 37 is fastened to the block 34 and serves to move the pulley 8. It should be noted that the piston rod 36 has a lost motion connection with the block 34 due to a pin 38 in the block extending through a slot 39 in the piston rod; a coiled compression spring 40 surrounds the piston rod and is compressed between the block 34 and a shoulder 41 on the rod. The purposes of the lost motion connection are to cushion the shock applied to the belt when the pulleys separate and also to control the tension applied to the belt. The latter result is attained chiefly by means of the spring 40 since the movement of the piston rod is so controlled in conjunction with the length of belt being covered as to compress the spring 40 when the belt is extended. If desired, the lost motion connection may be omitted and a conventional cushioned cylinder substituted for the cylinder 37. Compressed air is fed to cylinder 37 through a supply line 41 under control of a hand valve 42 (Fig. 1).

Not only is the pulley 8 moved relatively to pulley 7 to mount and tension the belt, but a separate adjustment of the pulley 8 is provided for to accommodate various lengths of belts. To this end, the bracket 28 may be moved along the length of the slide bar 29 to a position depending upon the length of the belt; a tightening screw 43 is carried by the bracket and is used to lock it in position on the slide bar.

Since the pulley 7 has a knurled flat surface on which the belt travels, the pulley 8 is grooved to keep the belt in alignment with the two pulleys. In addition, the groove in the pulley 8 may be adjusted to accommodate various widths of belts. Referring to Fig. 7, the bracket 28 is provided with an outwardly extending spindle 44 carrying a roller 45 mounted on spaced bearings 46. Opposite sides of the roller are provided with flanges 47 which are threaded in opposite directions. Two rim discs 48 are threaded onto the flanges 47. Each rim disc is provided with an inclined or bevelled surface 49 which forms with the outer edge of the roller 45 the groove in which the belt rides. A locking pin 50 extends through the discs and roller to hold the rim discs 48 in position. When it is desired to move the rim discs 48 to accommodate a different size belt, the pin 50 is removed and the discs held in the hand while the roller 45 is rotated by means of a handle 51. Because of the oppositely threaded flanges 47 the discs are thereby moved toward or away from each other, as the case may be. When the discs are in proper position, the locking pin is inserted to hold the parts in adjusted relationship.

As a further means of guiding the belt over the surface of pulley 7, guide rollers 52 are carried by arms 53 and engage opposite sides of the belt to center it over the pulley. The arms are pivoted to a bracket 54 fastened to panel 6 and are biased toward each other by a spring 55. A set screw 56 limits the travel of the arms so that a belt may be easily inserted between them.

When initially placed in position on the pulleys the belt is slightly tensioned by a roller 57 riding on the inner surface of the belt. The roller is carried on an arm 58 fastened to shaft 59 extending through a bearing 60 in the panel 6. The inner end of the shaft carries a tongue 61. Opposite ends of a tension spring 62 are fastened to the tongue 61 and panel 6 to bias the arm 58 and roller 57 against the belt. The purpose of the tensioning roller 57 is to prevent the belt from slipping off the pulleys before it is extended under full tension during the covering operation.

Referring to Fig. 1, the belt carcass 2 is adapted to be covered with a jacket which comprises one or more plies of sheet material 63. This material usually is formed of bias cut fabric, such as cotton, rayon, or the like, and is coated with a suitable rubber compound or other adhesive to insure a good bond with the belt carcass.

The supply of sheet material is coiled in a roll 63a and is fed off as needed to the belt by a mechanism to be described later. Manifestly, any number of plies may be applied to the belt carcass depending upon the required jacket thickness. The width of the ply 63 varies depending upon the size of the belt carcass. The application of the jacket ply to the belt carcass is begun at a point adjacent the wheel 7 by mechanism now to be described.

As shown in Figs. 1, 4 and 5, a guide roller 64 is adapted initially to place the jacket against the belt carcass. The guide roller is mounted for rotation on a shaft 65 and includes two spaced disc rollers 66 and an internal roller 67; the disc rollers 66 are also movable longitudinally along the shaft. Compression coiled springs 68 are mounted on shaft 65, one end of each spring resting against the corresponding disc roller 66 and the other end abutting a stop nut 69. In this way the disc rollers 66 are biased toward each other in a manner such that they serve lightly to grip each side of the belt. In order to position the belt within the guide roller 64, the roller is movable toward and away from the belt and means is provided to spread the disc rollers 66 so that the belt carcass will drop into proper position. To this end, the shaft 65 is fastened to an arm 70 which, in turn, is secured to a shaft 71 rotating in a bearing 72 on panel 6. As the guide roller 64 moves downwardly, looking at Fig. 1, it engages a separating cam 73 which acts on the disc rollers 66 to separate them, as shown in Figs. 4 and 5. Cam 73 is secured to a post 74 extending from panel 6. When loading a belt carcass on the machine, the guide roller 64 is moved to separated position by means of an air cylinder 75 the operation of which is controlled by the hand valve 42. The air cylinder is connected to the guide roller by means of a linkage which includes the shaft 71, a lever 76 fastened to the inner end of the shaft, an arm 77 pivoted to the lever and a pin 78, and a sliding arm 79 extending between pin 78 and the air cylinder 75.

When the machine is in belt loading position, the guide roller 64 is in engagement with the cam 73 and is away from the pulley 7. This provides room for easily mounting the belt on the pulleys 7 and 8. When control valve 42 is operated to energize the air cylinder 75, the guide roller is moved toward the pulley 7. As it moves, the belt carcass is positioned between the separated disc rollers 66 so that as the rollers leave the cam 73 the springs 68 force them into engagement with the opposite side edges of the belt, as shown by dotted lines in Fig. 5. Further movement of the guide roller helps to position the belt against the surface of pulley 7, as shown in Fig. 6. At the time that air cylinder 75 is energized to move the guide roller 64 in the manner indicated, the air cylinder 37 is likewise energized to separate the pulleys 8 and 7 so the belt carcass is tensioned on the pulleys preparatory to applying the jacket. The jacket 63 is applied by rotating the belt.

Initially, the jacket is moved to a position such that the severed end engages the outer surface of the belt. As the belt moves, it drags the jacket by friction into engagement with the guide roller 64 which performs the first folding operation on the jacket. As shown in Fig. 6, the jacket is held against the outer face of the belt carcass and the side edges folded substantially at right angles around opposite faces of the carcass. It should be noted that the guide wheel does not stitch the jacket to the side faces of the belt. To assist in folding the jacket, the disc rollers 66 are each provided with a bevelled surface 80.

The jacket is further folded and stitched around the belt carcass by mechanism which includes stitching rollers 81 and 82 and flipper wheels 83 and 84. As shown in Figs. 11, 12 and 13, each of the rollers 81 and 82 is mounted to rotate on a pin 85 fastened to a block 86 which, in turn, is slidably mounted on a bar 87. The bar 87 is secured to a supporting block 88 carried by the panel 6. An adjusting screw 89 threaded into bar 87 makes it possible to move the block 86, and with it the roller 81 or 82 toward and away from the panel. The adjustment is made to accommodate belts of varying widths. To accommodate belts of different thicknesses, the rollers 81 and 82 slide on the pins 85 against the action of compression springs 90 assembled around the pins. Each of the rollers 81 and 82 is provided with an overhanging bevelled edge or lip 91 to assist in folding the jacket around the belt carcass.

As the belt and jacket leave the roller 81, which stitches the jacket to one side of the belt, they pass beneath one of the flipper wheels which serves to stitch the corresponding edge of the jacket down onto the inner face of the belt. Each of the flipper wheels 83 and 84 is formed with a conical surface and is carried on a stem 92 rotatable in a bearing block 93. In addition, the stem may be moved axially of the bearing, it being held in extended position by a compression spring 94 located on the stem between the corresponding bearing and flipper wheel. Each bearing block 93 is fastened to a supporting bar 95 extending from the block 88 on panel 6. A slot 96 in the bar and fastening pin 97 provide for movement of the flipper wheel toward and away from the panel, during initial adjustment of the machine. It is not necessary to adjust the positions of the flipper wheels to accommodate small differences in belt sizes because the flipper wheels are of large enough area to engage the edges of the jacket at all times. It should be noted that the bearing blocks 93 are disposed at angles extending away from opposite sides of a plumb line; the angle is determined by the amount of angle built into the conical surfaces of the flipper wheels. In each case the angle is such that the surface of the conical flipper wheel wipes flat on the surfaces of the belt carcass and jacket as they pass beneath the wheel. This means that after the jacket is folded around the side of the belt by the stitching roller 81, for example, it is then stitched down tightly on the inner flat surface of the carcass by the flipper wheel 83. The flipper wheel gives a wiping action across the face of the belt so that the jacket is pulled tightly around the belt. Since the stitching rollers and flipping wheels are arranged to operate on opposite sides of the belt, the jacket is wrapped completely around the belt as it passes beneath these elements.

The effect produced by the stitching roller and flipping wheel in folding the jacket on one side or the other of the belt is to tend to force the belt out of a straight course of travel due to the forces exerted on the jacket during the folding operation. To overcome this and to keep the belt in a straight line during application of the jacket the machine is provided with guide rollers which maintain the belt in position and take up the forces imposed on the belt.

Such guide rollers are carried by a support 98 which is movable toward and away from the stitching rollers and flipping wheels. As shown by Figs. 11 and 13, the support includes spaced frame members 99 which carry laterally extending pins 100 and 101. One end of an arm 102 is pivotally mounted on pin 101 and the other end is pivoted to a shaft 103 extending from the panel 6 (Fig. 1). Similarly, a second arm 104 is pivoted to pin 100 at one end while its other end is fastened to a shaft 105 pivotally mounted in the panel. Shaft 105 extends through the panel and carries a lever 106 the outer end of which is pivoted to pin 78 in the linkage connected to air cylinder 75. When the air cylinder moves the linkage to the right, in Figs. 1 and 4, the arm 104 is rotated in a clockwise direction to elevate the support 98 at the same time that the guide roller 64 is elevated. The effect is to force the belt carcass into engagement with the stitching rollers and flipping wheels so that the jacket can be applied. By making the support 98 retractible, it is easy to mount the belt in position on pulleys 7 and 8 so that it hangs directly beneath the guide rollers 81 and 82 and the flipper wheels 83 and 84.

As shown in Figs. 11 and 13, the pin 100 carries a supporting roller 107 over which the belt travels and which provides a bearing surface against which the downward thrust of the flipper wheel 84 acts. In addition, pin 100 carries a block 108 which, in turn, supports a guide roller 109 acting against the side of the belt and supporting the belt against the sidewise thrust developed by the flipper wheel 84. In similar fashion the pin 101 carries a supporting roller 110 and a guide roller 111 cooperating with the flipping wheel 83. The rollers 111 and 109 cooperate with opposite sides of the belt and the roller 111 is provided with a bevelled surface 112 to facilitate seating of the belt carcass in position. To support the belt between the guide roller 64 and the first flipper wheel 83, the support 98 carries a roller 113 mounted on a pin 114 extending from the frame members 99; in addition, the pin carries a bracket 115 supporting a roller 116 having a bevelled face and which cooperates with the side of the belt opposite the stitching roller 81. The support 98 is also provided with an additional roller 117 over which the belt travels and which is located between the flipping wheels; it rotates on a pin 118 extending from frame members 99. When the support is elevated by the air cylinder the belt carcass is positioned between the rollers and wheels in the manner illustrated by Fig. 1. Thereafter, as the belt travels along the support the jacket is folded around and stitched to the belt in the manner already described.

A conveyor 118 is provided for feeding the jacket to the belt. In the form of the invention illustrated the conveyor is driven by frictional engagement with the belt although it should be manifest that a separate power drive may be used if desired. A bracket 119 is pivoted to panel 6 by a pin 120; the bracket carries a frame 121 having extensible end members 122 which, in turn, carry rollers 123 pivoted on bearings 124. A conveyor belt 125 is wrapped around the rollers 123; the belt may be properly tensioned on the rollers by moving the end members outwardly by means of the pin and slot connection 126. A weight in the form of a roller 127 carried by arm 128 pivoted to the bracket at 129 serves to hold the jacket in good frictional engagement with the conveyor belt. A guide roller 130 also serves to keep the jacket in position on the conveyor belt just before it reaches the belt carcass. Roller 130 is carried by a finger 131 adjustable in a clamp 132 fastened to the bracket 119. The forward end of the conveyor is so located that the conveyor belt 125 frictionally engages the belt carcass. As the belt carcass is rotated by pulley 7 the conveyor belt 125 is driven by friction to feed the jacket 63 to the belt being covered. It should be noted that any tension appearing in the jacket ply 63, as it is removed from the source of supply, has a tendency to tip the conveyor about the pivot 120 so that the conveyor belt is more tightly pressed against the rotating belt carcass. In this way slippage between the conveyor belt and belt carcass is greatly reduced providing for accurate feeding of the jacket.

When the machine is in position to load the belt carcass, the conveyor is tipped away from the pulley 7, in the manner shown by Fig. 4. To accomplish this, the conveyor is provided with an extending arm 133 which is engaged by the guide roller 64 as the latter is moved away from the pulley 7 by actuation of air cylinder 75. The conveyor pivots about pin 120 and returns to normal position as soon as the guide roller moves the belt carcass into position. Upon completion of the wrapping operation the conveyor is tipped away from engagement with the belt as the guide roller moves downwardly.

In some instances it is desirable to provide a separate take-off mechanism for feeding the jacket ply to the conveyor. This is particularly desirable if the ply fabric is rolled up without a liner separating the layers so that a considerable amount of force is required to unwind it from the supply roll. Moreover, if a take-off mechanism is provided the jacket can be supplied to the belt carcass by the conveyor under uniform tension so that a more uniform product is obtained. In the instant case, the jacket is fed over and under guide rollers 133 and 134 to a roller 135 on a control lever 136 which operates the take-off mechanism. Each of the rollers 133ª, 134 and 135 is constructed in a similar manner and may be adjusted to accommodate different width plies.

Referring to Fig. 9, the roller 135 comprises a stem 136ª journalled in bearings 137 carried by the lever 136. The stem is fitted into a hollow cylinder 138 provided with spacing discs 139 which are prevented from rotating by keys 140 sliding in slots 141 in the cylinder. A cap 142 closes the end of the cylinder and an adjusting screw 143 having reverse threads extends through the discs 139. By rotating the screw 143 the discs 139 are moved toward or away from each other to accommodate various width plies. As shown in Fig. 3, the guide rollers 133ª and 134 are mounted in bearings 144 and 145, respectively, fastened to the frame 4.

In the case of the guide roller 134, a separate adjustment is provided for controlling the direction of movement of the jacket (Fig. 3). To this end, the bearing 145 is mounted on a pin 145ª carried by frame 4; the bearing can be moved toward and away from the frame by means of a set-screw 146ᵇ. In addition, the bearing may be tilted about the pin by a second set-screw 146ᶜ threaded into a stud 146ᵈ carried by the frame and a projection 146ᵉ on the bearing; the result is that the guide roll can be tilted slightly, as indicated by the arrow in Fig. 3 to control the direction of jacket travel.

Referring to Fig. 3, power is supplied to the take-off mechanism from the gear box 12 by means of a sprocket wheel 146, chain 147 and sprocket wheel 148 of a gear train 149. The gear train includes two meshing gears 150 and 151 which are connected to one face of a clutch mechanism 152. The purpose of the gear train is to reverse the direction of rotation of the clutch with respect to the gear mechanism 12. The other face of the clutch is connected to the take-off mechanism. As shown in Fig. 1, the jacket ply 63 passes from the roll 63ª beneath a driven roller 153 and then over on idler roller 154 to the roller 135 on the clutch operating arm. The rollers 153 and 154 are provided with ply guiding discs 139 and are similar in construction to the roller 135 already described. During operation of the machine the jacket ply is held in position against the drive roller 153 by a pressure roller 155 carried by an arm 156 pivoted to the frame. A spring 157 biases the roller 155 into position.

As shown in Fig. 9, the drive roller 153 is connected to the other face of the clutch mechanism by means of a stem 158 keyed to the clutch as indicated at 159 and rotatable in spaced bearings 160 carried in a housing 161. The housing is fastened to a plate 4ª carried by the aforementioned frame and serves as a bearing for a sleeve 162 formed at one end of the lever 136. In this way the lever pivots on the housing 161. The sleeve itself is formed with a plurality of bevelled teeth 163 (Fig. 8) which mate with corresponding teeth in a bearing plate 164 rotatable on stem 158. A thrust bearing 165 is located between the plate and the clutch mechanism. The arrangement is such that as the lever 136 is pulled upwardly the action of the bevelled teeth 163 force the plate 164 and the clutch face to slide on the stem 158 to engage the clutch. This drives the roller 153 at a speed which is synchronized with the speed at which the belt carcass 2 is rotating so that the proper amount of jacketing material is removed from the roll 63ª. The roll 63ª of jacket stock is carried on a pulley 166 supported from an arm 167 which swings from a pivot 168 in frame 4ª.

In the event that liner material, indicated at 169, is utilized to separate adjacent plies on the roll 63ª, separate means is provided to wind up the liner and separate it from the jacket ply. The liner is fed to a take-up capstan which includes a spool 171 floating in a bracket 172. The liner material is wound around the spool 171 which rests on two friction drive rollers 173 and 174. As the thickness of the roll of liner material increases, the spool 171 is raised in slots 175 in the bracket 172. Toothed wheels 176 on opposite ends of spool 171 maintain the spool level by climbing in racks 177 formed in the walls of the slots.

In order to drive the rollers 173 and 174, the clutch mechanism is provided with a sprocket wheel 178 meshing with a chain 179 which engages a gear 180 fastened to a shaft 181 on which the drive roller 173 is mounted. The shaft rotates in a bearing 182 mounted on the table 4ª. In order to rotate the drive roller 174 in the same direction as the roller 173, the shaft 181 is provided with a sprocket wheel 183 which engages a drive chain 184, the chain, in turn, meshing with a sprocket wheel 185 carried on the shaft 186 which supports the drive roller 174. The shaft 186 rotates in a bearing 187 supported on the plate 4ª (Fig. 3). The arrangement is such that when the drive roller 153 is driven by engagement of the clutch 152, the guide rollers 173 and 174 are likewise driven at a related constant speed so that the roll of liner material built up on the spool 171 will be rotated at sufficient speed to take up any slack in the material being removed from the supply roll 63ª. A separating bracket 188 is located between the guide roll 154 and the guide rollers 173 and 174 to separate the jacket ply 63 and the liner material 169 particularly when the machine is being loaded.

In operating the machine, a belt carcass 2 is looped over the tension roller 57 and then mounted on the pulleys 7 and 8 in position to be covered with the jacket material 63. Inasmuch as the support 98 is at its lowest position spaced away from the stitching rollers 81 and 82, and the flipper wheels 83 and 84, the belt may be easily mounted in position beneath these elements, as shown in Fig. 4. The operator now turns valve 42 to admit air to the cylinders 37 and 75. This moves the pulley 8 away from the pulley 7 and tensions the belt about the pulleys and, at the same time, the support 98 is moved toward the stitching rollers and flipper wheels so that the belt is forced against them, in the position shown by Fig. 1. Simultaneously, the guide roller 64 is moved to a position such that it engages the belt, as shown in Figs. 1 and 6. By stepping on the control pedal 19, the operator now causes the drive pulley 7 to rotate the belt; at the same time the operator tilts the conveyor to cause it to firmly engage the belt carcass. Since the pulley with the belt carcass mounted thereon is in frictional engagement with the conveyor belt 125 the jacket ply 63 is fed to the belt and is initially applied against the belt carcass by the guide roller 64, in the manner illustrated by Fig. 6. As the belt carcass continues to rotate it carries the jacket ply 63 into engagement with the stitching rollers 81 and 82, and the flipper wheels 83 and 84, which operate to fold one side of the jacket and then the other around the belt, in the manner already described. The belt rotates quickly until it is completely covered. The operator then releases the foot pedal to stop the machine and the jacket ply 63 is severed at a point adjacent the drive pulley 7. However, if it is desired to apply more than one ply of the jacket material to the belt the operator simply continues rotation of the belt until sufficient of the jacket material has been applied over the first ply to form the second. As the strip of jacket material 63 is pulled along by the conveyor 118 it raises the control arm 136 to engage the clutch mechanism 152 so that the take-off drive roll 153 is driven to remove the jacket material from the supply roll 64. At the same time, guide rollers 173 and 174 rotate to wind up the liner 169 on the roller 171.

The machine is easy to load and quickly applies the jacket ply to the belt carcass under a substantially uniform tension. The cone-shaped surfaces of the flipper wheels 83 and 84 pull the jacket material tightly around the belt. It should be noted that the jacket wrapping mechanism including the arrangement of the stitching rollers and flipper wheels, together with the movable guide support 98, may be used to wrap jackets around long lengths of belt in which case separate supports are used for the belt. In the case of endless belts, the movable pulleys 7 and 8 supporting the belt cooperate with the wrapping mechanism by tightening the belt so that it moves upwardly against the stitching rollers and flipper wheels, at the same time that the support 98 moves upwardly, so that the various guide rollers carried by the support function to locate and maintain the belt carcass in position against the stitching rollers and flipper wheels. Although the machine has been illustrated as applying only a single ply of jacketing material it should be manifest that two plies may be applied simultaneously by feeding them into the guiding and folding mechanism. Also, when a plurality of jackets are applied to the belt carcass they may be stitched to opposite faces of the belt by applying a jacket to one face, removing the belt, turning it inside out, and then remounting it on the machine for application of the other jacket.

Having thus described our invention, what we claim and desire to protect by Letters Patent is:

1. In a machine for building belts, spaced rotatable members for supporting a belt, means including said members for moving the belt, means for feeding a jacket of sheet material to the belt as the belt moves, stitching rollers for applying the material to opposite sides of the belt, flipper wheels for folding the edges of the material around another side of the belt in overlapping relationship and a support spaced from said stitching rollers and flipper wheels and movable into engagement with the belt to hold it and said material in engagement with said flipper wheels and stitching rollers.

2. In a machine for building endless belts, spaced rotatable members for supporting a belt, said members being movable relative to each other to tension the belt, means for feeding a jacket of sheet material to the belt, means for folding the sheet material around the belt, a movable support adjacent to but spaced from said folding means, and interconnected means for simultaneously moving said members to tension the belt and move said support into engagement with the belt to hold the latter and jacket in engagement with said folding means.

3. In a machine for building endless belts, spaced rotatable members movable relative to each other to support and tension a belt, means for folding a jacket of sheet material around the belt, a support adjacent to but spaced from said folding means and movable into engagement with the belt and jacket, and means cooperating with the rotatable members to tension the belt and simultaneously move said support into engagement with the belt and jacket to hold the latter in engagement with the folding means.

4. In a machine for building endless belts, means for supporting and rotating a belt under tension, means for feeding a jacket of sheet material into engagement with one face of the belt and means for wrapping the material around the body of the belt comprising alternate stitching rolls and flipper wheels and a support adjacent to but spaced from wheels, said support being movable against the belt to hold the jacket and belt in engagement with the wrapping means.

5. In a machine for building belts, means for supporting and moving a belt, and means for applying a jacket of sheet material to the belt as the belt moves including a movable support having a roller along which the belt and jacket travel, a stitching roller and associated conical flipper wheel for wrapping one side of the sheet material around the belt, a second stitching roller and associated flipper wheel for wrapping the other side of the sheet material around the belt and means biasing the movable support toward the stitching rollers.

6. In a machine for building belts, means for supporting and moving a belt carcass, means for feeding a jacket of sheet material to the belt as the belt moves, means for wrapping the material around the belt carcass including stitching rollers for applying the material against the carcass, a movable support for the belt spaced from the stitching rollers and being provided with guide rollers adapted to cooperate with said stitching rollers in applying the material to the carcass and means for moving the support to place the belt in operative position with said stitching and guide rollers.

7. In a machine for building belts, means for supporting and moving a belt carcass, means for feeding a jacket of sheet material to the belt, means for wrapping the material around the belt carcass including conical flipper wheels for applying the material against the carcass, a movable support for the belt spaced from the flipper wheels and being provided with guide rollers adapted to cooperate with said flipper wheels in applying the material to the carcass and means for moving the support toward said wrapping means to place the belt in operative position with said flipper wheels and guide rollers.

8. In a belt covering machine, means for supporting and moving a belt carcass, means for feeding a jacket of sheet material to the belt, means for wrapping the material around the belt carcass including a flipper wheel having a conical surface wiping across one face of the belt carcass and means including a guide roller engaging an adjacent face of the belt carcass and cooperating with the flipper wheel to maintain the belt in engagement therewith against the thrust of the flipper wheel as it wipes across the belt carcass.

9. In a belt covering machine, means for supporting and moving a belt carcass, means for supplying a jacket of sheet material to the belt, means for wrapping the material around the belt carcass including a stitching roler for applying one edge of the material to one face of the carcass and a flipper wheel having a conical surface wiping across an adjacent face of the carcass for completing application of the said edge to said adjacent face of the carcass, and means including guide rollers engaging other faces of the belt and cooperating with the stitching roller and flipper wheel to maintain the belt in engagement therewith against the thrusts of the stitching roller and the flipper wheel as the latter wipes across the carcass.

10. In a belt covering machine, means for supporting and moving a belt carcass, means for supplying a jacket of sheet material to the belt, means for wrapping the material around the belt carcass including stitching rollers for applying opposite edges of the material to opposite faces of the carcass and flipper wheels having conical surfaces wiping across an adjacent face of the carcass for completing application of the edges to said adjacent face of the carcass in overlapping relationship, and means including guide rollers engaging other faces of the belt and being movable into position to cooperate with the stitching rollers and flipper wheels to maintain the belt in engagement therewith against the thrusts of the stitching rollers and the flipper wheels as the latter wipe across the carcass.

11. In a machine for building endless belts, spaced rotatable members for supporting a belt carcass, said members being movable away from each other to tension the belt, a source of sheet material to jacket the belt, a movable guide roller having separable guiding discs for applying the sheet material to a face of the belt carcass and folding opposite edges at an angle to said face, means for separating said guiding discs to position the belt carcass therebetween, and means for simultaneously moving said members to tension the belt carcass and move said guide roller into engagement with the belt carcass.

12. In a belt covering machine, means for supporting and moving a belt carcass, means for supplying a jacket of sheet material to the belt, a movable guide roller having separable guiding discs, means for separating said guiding discs to position the belt carcass therebetween, and means for releasing said guide roller from said separating means and moving it into engagement with the belt carcass whereby said guide roller applies the sheet material to a face of the belt carcass and folds opposite edges of the material at an angle to said face as the belt moves.

13. In a belt covering machine, means for supporting and moving a belt carcass, means for supplying a jacket of sheet material to the belt carcass, a movable guide roller having separable guiding discs, a cam for separating said guiding discs for positioning the belt carcass therebetween and means for releasing said guide roller from said cam and moving it into engagement with the belt carcass whereby said guide roller applies the sheet material to a face of the carcass and folds opposite edges at an angle to said face as the belt moves.

14. In a belt covering machine, means for supporting and moving a belt carcass, means for supplying a jacket of sheet material to the belt, a guide roller having separable guiding discs for receiving the belt carcass to apply the sheet material to a face of the carcass and fold opposite edges at an angle to said face, stitching rollers for applying said opposite edges of the material to opposite faces of the carcass, and conical flipper wheels for completing application of the edges to an adjacent face of the carcass in overlapping relationship.

15. In a belt covering machine, means for supporting and moving a belt carcass, means for supplying a jacket of sheet material to the carcass, a guide roller having separable guiding discs for receiving the carcass to apply the sheet material to a face of the belt carcass and fold opposite edges at an angle to said face, stitching rollers for applying said opposite edges of the material to opposite faces of the belt carcass, conical flipper wheels for completing application of the edges to an adjacent face of the carcass in overlapping relationship and means including guide rollers engaging faces of the belt and cooperating with the stitching rollers and flipper wheels to maintain the belt in engagement therewith against the thrusts of the stitching rollers and flipper wheels.

16. In a machine for building endless belts, spaced rotatable members for supporting a belt carcass, said members being movable relative to each other to tension the belt, means for supplying a jacket of sheet material to the carcass, a movable guide roller having separable guiding discs, means for separating said guiding discs to position the carcass therebetween, means for simultaneously moving said members to tension the belt and move said guide roller into engagement with the carcass so that upon movement of the belt the guide roller applies the sheet material to a face of the carcass and folds opposite edges at an angle to said face, stitching rollers for applying said opposite edges of the material to opposite faces of the carcass and flipper wheels for completing application of the edges to an adjacent face of the carcass in overlapping relationship.

17. In a machine for building endless belts, spaced rotatable members for supporting a belt carcass, said members being movable relative to each other to tension the carcass, means for supplying a jacket of sheet material to the belt, a movable guide roller having separable guiding discs, means for separating said guiding discs to position the belt therebetween, means for simultaneously moving said members to tension the belt and move said guide roller into engagement with the carcass to apply the sheet material to a face of the belt and fold opposite edges at an angle to said face as the belt moves, stitching rollers for applying said opposite edges to opposite faces of the belt carcass, conical flipper wheels for completing application of the edges to an adjacent face of the carcass in overlapping relationship and means including guide rollers engaging other faces of the belt and cooperating with the stitching rollers and flipper wheels to maintain the belt in engagement therewith against the thrusts of the stitching rollers and flipper wheels.

18. In a machine for building endless belts, spaced rotatable members for supporting a belt carcass, said members being movable relative to each other to tension the carcass, means for supplying a jacket of sheet material to the belt carcass, a movable guide roller having separable guiding discs for positioning the carcass therebetween, said guide roller being adapted to apply the sheet material to a face of the carcass and fold opposite edges at an angle to said face as the belt moves, stitching rollers for applying said opposite edges of the material to opposite faces of the carcass, flipper wheels for completing application of the edges to an adjacent face of the carcass in overlapping relationship, a movable support spaced from the flipper wheels and carrying guide rolls adapted to cooperate with the flipper wheels and stitching rollers to maintain the belt in position against the thrusts thereof, and means for simultaneously moving said members to tension the belt, moving said guide roller into engagement with the belt and moving said support to position the guide rolls in cooperation with said stitching rollers and flipper wheels.

19. In a machine for building endless belts, spaced rotatable members for supporting a belt carcass, said members being movable relative to each other to tension the carcass, means for supplying a jacket of sheet material to the belt carcass, a guide roller for applying the sheet material to a face of the carcass and folding opposite edges at an angle to said face as the belt moves, stitching rollers for applying said opposite edges of the material to opposite faces of the carcass, flipper wheels for completing application of the edges to an adjacent face of the carcass in overlapping relationship, a movable support for the belt spaced from the flipper wheels and carrying guide means adapted to cooperate with the flipper wheels and stitching rollers to maintain the belt in position against the thrusts thereof, and means for simultaneously moving said members to tension the belt and to move said support into engagement with the belt carcass to hold it in engagement with the stitching rollers and flipper wheels.

20. In a machine for building endless belts, spaced rotatable members for supporting a belt carcass, said members being movable relative to each other to tension the carcass, means for supplying a jacket of sheet material to the belt carcass, a movable guide roller having separable guiding discs for positioning the carcass therebetween, said guide roller being adapted to apply the sheet material to a face of the carcass and fold opposite edges at an angle to said face as the belt moves, means for completely folding the sheet material around the belt carcass, a movable support adjacent to but spaced from said folding means and means for simultaneously moving said members to tension the belt, moving said guide roller into engagement with the belt and moving said support into engagement with the belt to hold the latter and jacket in engagement with said folding means.

21. In a machine for building endless belts, spaced rotatable members for supporting a belt, said members being movable relative to each other to tension the belt, means including a conveyor for feeding a jacket of sheet material to the belt, means for folding the sheet material around the belt, a movable support adjacent to but spaced from said folding means, and means for simultaneously moving said members to tension the belt and move said support into engagement with the belt to hold the latter and jacket in engagement with said folding means.

22. In a belt covering machine, means for supporting and moving a belt carcass, means including an endless belt type conveyor for feeding a jacket of sheet material to the belt, a guide roller for applying the sheet material to a face of the belt carcass and folding opposite edges at an angle to said face, stitching rollers for applying opposite edges to opposite faces of the belt carcass and flipper wheels for completing application of the edges to an adjacent face of the carcass in overlapping relationship.

23. In a belt covering machine, means for supporting and moving a belt carcass, means including an endless belt type conveyor driven by movement of the belt carcass for feeding a jacket of sheet material to the belt, and means for folding the sheet material around the belt.

24. In a belt covering machine, means for supporting and moving a belt carcass, means including a conveyor driven by movement of the belt carcass for feeding a jacket of sheet material to the belt, means responsive to tension in the sheet material for removing the latter from a supply roll and feeding it to said conveyor, and means for folding the sheet material around the belt.

25. In a belt covering machine, means for supporting and moving a belt carcass, means including an endless belt type conveyor driven by movement of the belt carcass for feeding a jacket of sheet material to the belt, a movable guide roller for applying the sheet material to a face of the belt carcass and folding opposite edges at an angle to said face, means for completely folding the sheet material around the belt, and means responsive to movement of said guide roller for controlling operation of said conveyor.

26. In a belt covering machine, means for supporting and moving a belt carcass, a pivotally mounted belt conveyor for pivoting into engagement with the belt carcass whereby said conveyor belt feeds a jacket of sheet material to the belt carcass upon movement of the carcass, and means for tipping the conveyor out of engagement with the belt carcass.

27. In a belt covering machine, means for supporting and moving a belt carcass, means for feeding a jacket of sheet material to the belt carcass, means responsive to tension in the sheet material for removing a length of material from a supply roll having liner material between adjacent windings, a take-up mechanism for the liner material, and means for folding the sheet material around the belt carcass as the belt moves.

28. In a belt covering machine, means for supporting and moving a belt carcass, means for feeding a jacket of sheet material to the belt carcass, means operated by a control arm engaging the sheet material and including a drive roller for removing a length of material from a supply roll, and means for folding the sheet material around the belt carcass when the belt moves.

29. In a belt covering machine, means for supporting and moving a belt carcass, means for feeding a jacket of sheet material to the belt carcass, means operated by a control arm engaging the sheet material and including a drive roller for removing a length of material from a supply roll having liner material between adjacent linings, a take-up mechanism driven from said last mentioned means for separating the liner material from the sheet material, and means for folding the sheet material around the belt carcass as the belt moves.

OTTO F. HOMEIER.
LOUIS SCHEIB.

REFERENCES CITED

The following references are of record in the file of this patent:

UNITED STATES PATENTS

| Number | Name | Date |
|---|---|---|
| 1,747,856 | Burkley et al. | Feb. 18, 1930 |
| 1,827,674 | Shively | Oct. 13, 1931 |
| 1,888,356 | Mayne | Nov. 22, 1932 |
| 1,924,067 | Gerstenslager | Aug. 22, 1933 |
| 2,409,974 | Breth et al. | Oct. 22, 1946 |